UNITED STATES PATENT OFFICE.

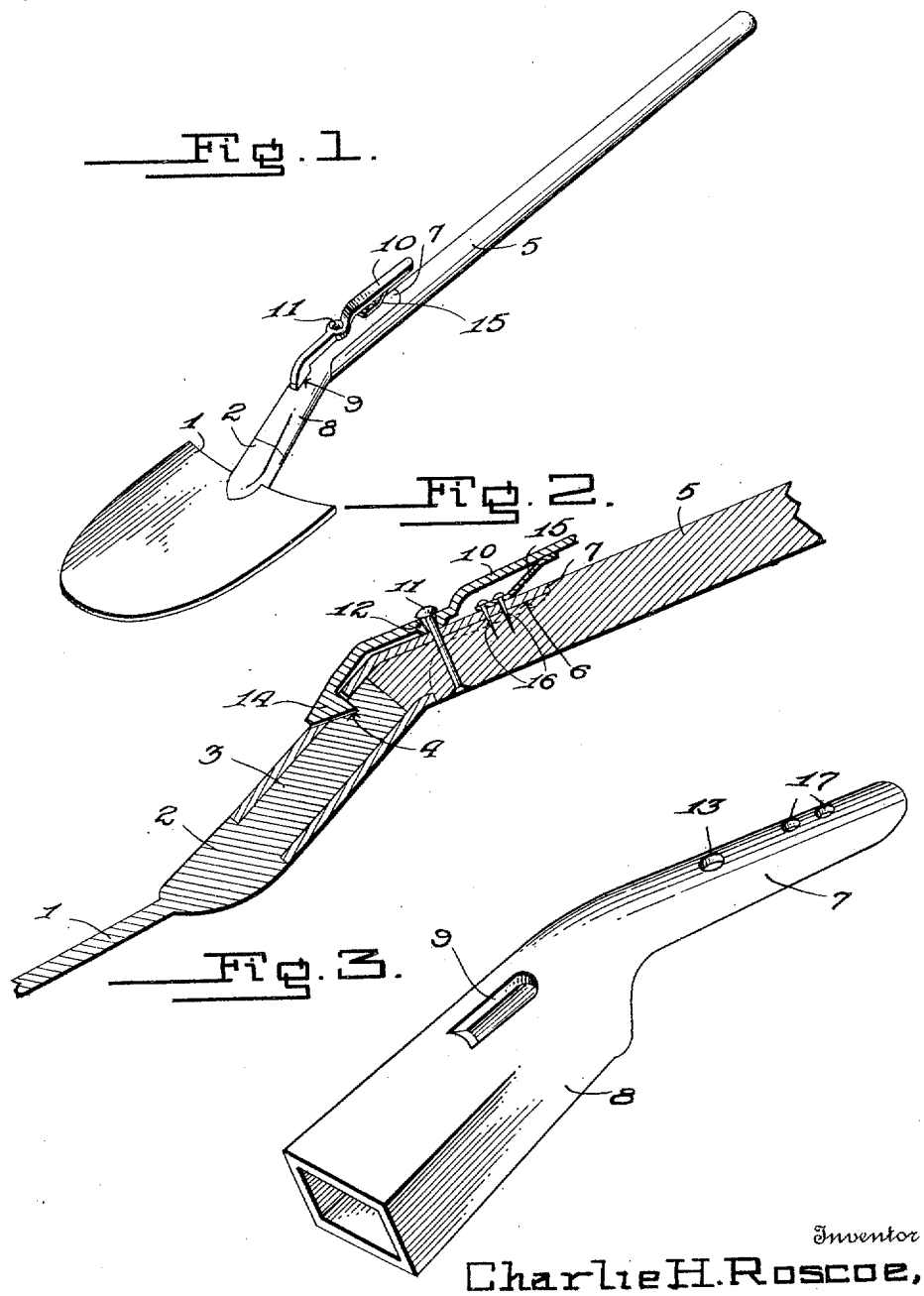

CHARLIS HENRY ROSCOE, OF GOLDSMITH, NEW YORK.

SHOVEL-HANDLE.

986,761.  Specification of Letters Patent.  Patented Mar. 14, 1911.

Application filed September 6, 1910.  Serial No. 580,521.

*To all whom it may concern:*

Be it known that I, CHARLIS HENRY ROSCOE, citizen of the United States, residing at Goldsmith, in the county of Franklin and State of New York, have invented certain new and useful Improvements is Shovel-Handles, of which the following is a specification, reference being had therein to the accompanying drawing.

This invention relates to shovels, and the principal object thereof is to provide a means whereby the same handle may be used for a number of blades so that a handle and number of blades may be sold as a complete set, each of the blades being different.

This improved shovel is illustrated in the accompanying drawings wherein:—

Figure 1 is a perspective view of the improved shovel. Fig. 2 is a longitudinal sectional view showing the means for holding the shovel blade within the socket piece. Fig. 3 is an enlarged perspective view of the socket piece.

Referring to the accompanying drawings:—1 indicates a shovel blade which may be of any type desired and which is provided with the usual shank 2 which has a reduced rectangular upper portion 3 provided in one of its faces with a notch 4 formed near the end of the shank. The handle 5 is provided at its lower end with a longitudinal seat 6 in which an elongated extension 7 of a rectangular socket piece is mounted. From an inspection of Fig. 2 it will be seen that the socket piece is bent at an angle near the upper end so as to make the shovel more convenient to use.

The socket piece is provided with an elongated aperture 9 formed in its upper surface and which registers with the notch 4 when the reduced portion 3 is inserted within the socket. A catch 10 is secured to the extension 7 by means of a bolt 11 which passes through an opening 12 formed in the catch and opening 13 formed in the extension. It will be seen that the opening 12 is larger at its outer end than at the inner end and that the inner end is surrounded by a rim upon which the catch pivots. By this construction the catch can have a limited amount of movement. The lower end of the catch is provided with an enlarged pointed head 14 which passes through the aperture 9 and rests within the notch 4 to retain a shovel blade in place. The head 14 is normally held in contact with the notch 4 through the medium of a spring arm 15 which is secured to the handle by means of the nails 16 which pass through the openings 17. If desired, any other means may be used for holding the spring arm in place, such for instance, as welding it to the extension 7. The free end of the spring engages the under surface of the catch and holds it in place. By having the reduced end 3 and the socket piece formed rectangularly the shovel blade is prevented from having any rotary movement which might force the catch out of engagement with the notch 4 and thus permit the shovel blade to drop out of the socket.

Having thus described my invention, what I claim is:—

A shovel comprising a handle, a socket piece secured upon said handle, said socket piece having an elongated extension provided with an aperture, a shovel blade fitting within said socket piece, a catch engaging said blade and provided with a tapered opening, a rim surrounding the inner end of said opening and forming a pivot for said catch, a pin passing through said tapered opening and said aperture in said elongated extension and pivotally mounting said catch upon said handle, and a spring for normally holding said catch in position to retain said blade in place.

In testimony whereof I hereunto affix my signature in presence of two witnesses.

CHARLIS HENRY ROSCOE.

Witnesses:
 G. E. MEYER,
 JULIA L. SMITH.

Copies of this patent may be obtained for five cents each, by addressing the "Commissioner of Patents, Washington, D. C."